(12) United States Patent
Snyder et al.

(10) Patent No.: US 6,748,693 B1
(45) Date of Patent: Jun. 15, 2004

(54) PHOSPHORESCENT LIVE BAIT

(76) Inventors: Gary Snyder, 15372 640$^{th}$ St., Dodge Center, MN (US) 55927; David L. Riess, 838 5$^{th}$ Ave., Rochester, MN (US) 55904

( * ) Notice: Subject to any disclaimer, the term of this patent is extended or adjusted under 35 U.S.C. 154(b) by 0 days.

(21) Appl. No.: 10/256,399

(22) Filed: Sep. 27, 2002

(51) Int. Cl.$^7$ .............................................. A01K 85/00
(52) U.S. Cl. ................... 43/42.53; 427/4; 426/1
(58) Field of Search ..................... 43/42.53, 42.32, 43/45, 42; 426/1; 119/6.7; 427/4

(56) References Cited

U.S. PATENT DOCUMENTS

| | | | | |
|---|---|---|---|---|
| 2,605,578 A | * | 8/1952 | Waterton | 43/42.05 |
| 2,849,981 A | * | 9/1958 | Rose | 119/6.7 |
| 3,480,456 A | * | 11/1969 | Forkner | 427/4 |
| 3,545,404 A | * | 12/1970 | Loftus | 119/6.7 |
| 3,568,354 A | * | 3/1971 | Yacko | 43/17.6 |
| 3,935,659 A | * | 2/1976 | McCallum | 43/17.6 |
| 4,202,905 A | * | 5/1980 | Asai et al. | 426/1 |
| 4,486,460 A | * | 12/1984 | Kienast et al. | 427/4 |
| 4,728,514 A | * | 3/1988 | Lechnir | 428/1 |
| 6,048,554 A | * | 4/2000 | Collins et al. | 426/1 |
| 6,289,844 B2 | * | 9/2001 | Giannaris | 119/6.7 |

* cited by examiner

Primary Examiner—Kurt Rowan
(74) Attorney, Agent, or Firm—DL Tschida

(57) ABSTRACT

Live bait colorized with opaque and/or phosphorescent materials to luminesce and exhibit enhanced coloration when suspended within a body of water. In one process, the back of the bait is coated with a suspension mixture (e.g. 30% glow powder and 70% carrier) of a phosphorescent pigment and cured at an elevated temperature. In another process, the back of the bait is coated with a phosphorescent powder that is fixed with a spray applied clear coat and/or adhesive. The coating is subjected for a brief period to a curing temperature in excess of room temperature to set the paint and/or clear coat and/or adhesive. Multiple coatings or combinations of suspension mixtures and powdered coatings provide desired colorized live bait without deleteriously affecting the bodily functions of the bait.

20 Claims, 3 Drawing Sheets

US 6,748,693 B1

PHOSPHORESCENT LIVE BAIT

BACKGROUND OF THE INVENTION

The present invention relates to live bait for fishing and, in particular, to a process for coating bait (e.g. larval and nymph stage bait) with a phosphorescent material such that the bait can phosphoresce when properly illuminated during fishing.

The most common fishing bait is live bait. The best type of bait depends upon the prey species, the body of water and the time of year. Some of the most common bait for fresh water fishing in the United States are minnows, leeches, crawfish, frogs, salamanders, grasshoppers, crickets, earth worms, night crawlers, wax worms, meal worms, maggots, spikes and grubs.

A variety of other baits and other larval and nymph forms of baits are also available. Live bait is typically sold in its natural state and coloration. The bait is trapped in the wild or on occasion is commercially raised under controlled conditions.

The principal attractant quality of live bait is believed to be the bait's scent. Coloration and movement also serve as attractant qualities. The quality of the water, however, can limit the effects of coloration. Many artificial baits therefore use opaque colors that are arranged in non-natural patterns. The belief is that the exaggerated colors are more visible versus a purely natural pattern, although many recent lures are constructed with natural appearing finishes.

Because dark and stained water limit the visibility of any bait, attempts have been made to enhance and/or change the coloration of some live bait. Maggots and some worms for instance are sold in shades of red, green and yellow. These and other opaque colors are achieved by feeding colorized foods to the bait. The translucent bodies of the bait allow the colors to be visible and which condition can continue for a sufficient period of time to accommodate the bait storage and use cycle.

Attempts have also been made to dye bait. Dyes, however, are found to be generally toxic to most bait. Similarly, attempts to fully or partially cover live bait with vinyl mixtures (e.g. methyl isobutyl keytone, xylene mixtures) have proven toxic.

Luminous, phosphorescent artificial baits have also recently become very popular. These baits are manufactured to glow in different colors or color combinations. The belief is that fish are able to better distinguish such bait in dark and/or stained water. The phosphorescent materials are incorporated into the plastic lure bodies or painted onto the bodies. No phosphorescent live baits, however, are believed to exist.

The live bait of the present invention were developed to luminesce when subjected to light and to maintain this condition when immersed in water. The bait are treated in a fashion that is not toxic or detrimental to the health of the bait.

The bait are particularly colored with phosphorescent paint-like mixtures (e.g. luminescent pigment, carrier/adhesive) that are applied over a portion of the bait's body, predominately the back. The body pores of the bait are thereby not substantially blocked from necessary oxygen transfer, secretions or other life sustaining functions. The mixtures appear to be non-toxic when externally applied to many larval forms of bait. The mixtures bond sufficiently to not flake or wash off during normal use. A variety of non-luminescent, opaque colors might also be applied in a similar fashion alone or in combination with the luminescent colorants.

SUMMARY OF THE INVENTION

It is a primary object of the invention to provide opaque and phosphorescent colorized live bait.

It is further object of the invention to colorize live bait with a painting process using luminous and/or opaque paints.

It is further object of the invention to colorize live bait with a luminous, colored pigment that is fixed to the bait with a sprayed clear carrier (e.g. polyurethane, lacquer, adhesive).

It is a further object of the invention to cure an applied carrier/pigment mixture and/or a dry applied colorant coated with a clear fixative to fix the colorant to the bait.

It is further object of the invention to colorize live bait with a luminous, colored pigment that is fixed to the bait with a sprayed clear carrier.

It is a further object of the invention to use an adhesive to bond the colorant to the live bait.

The foregoing objects, advantages and distinctions of the invention are obtained in several presently preferred processes. During initial preparations steps of each process, the individual bait is segregated to assure proper coating, for example, the bait is distributed in a container that limits bait motion and prevents overlapping to assure even coverage. The bait temperature is also raised to approximately room temperature.

In a first process, the backs of the bait are sprayed with a suspension mixture of a phosphorescent pigment (e.g. 30% glow powder and 70% carrier). The mixture is then cured, either at room temperature or by briefly subjecting the bait to a curing temperature, such as in the range of 80 to 110° F. for 3 to 10 minutes to set the mixture.

In another process, a dry powder paint pigment is sprinkled over the bait. A clear coat material is then sprayed over the coated bait. The clear coating is then cured to bond the powder to the bait.

In other processes, an adhesive is applied with the mixture, dry powder pigment or carrier. The adhesive is then cured to bond the powder to the bait.

Still other objects, advantages, distinctions and constructions of the invention will become more apparent from the following description with respect to the appended drawings. Similar materials and process steps are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
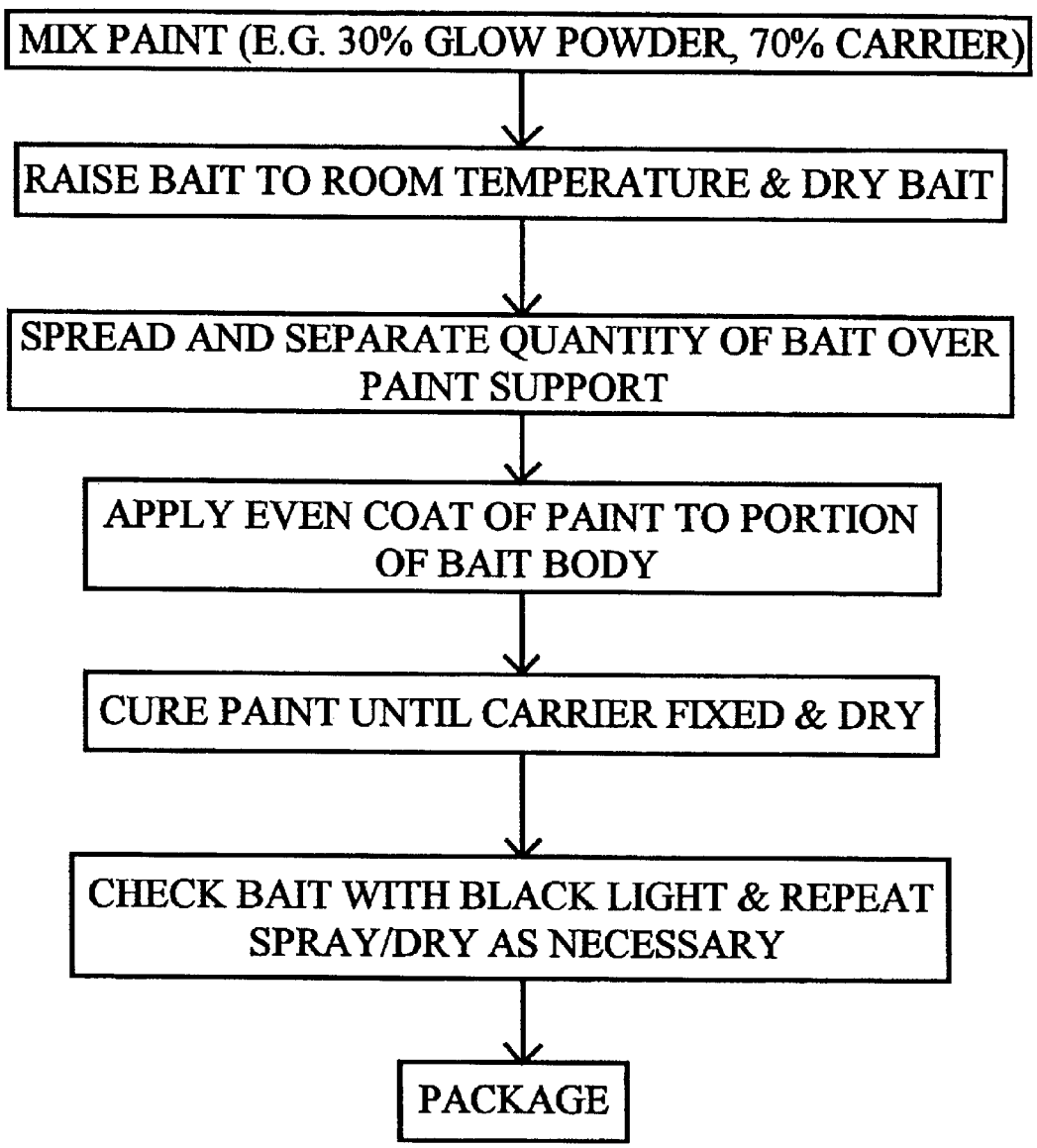
FIG. 1 is a process flow chart to a suspension mixture (e.g. paint) colorization process.

A particular concern when coloring live bait is to assure the health of the bait. Any pigment or colorant selected must be non-toxic to the bait, especially over the period of the normal shelf life of the bait. The colorant ideally should not be absorbed into the bait and should not prevent normal body functions, such as the transfer of oxygen or body secretions. The colorant must be substantially colorfast and not flake or unduly wear off during storage. The colorant must be safe and non-toxic to the fisherman and the environment, for example many luminous or "glow" pigments are radioactive. The colorant must also be able to withstand the aquatic environment and a reasonably wide range of temperatures during the storage and use of the bait.

A presently preferred phosphorescent pigment is of an alkaline earth aluminate type that exhibits a long decay by rare earth phosphor ions. Pigments of this type exhibit improved brightness and glow durations, substantially greater than exhibited by traditional phosphors of zinc sulfide. The pigments are non-toxic to humans and are not radioactive. They also exhibit good stability below 400° C.

The pigments also mix well with readily available resins, such as acrylic resin, PU resins, poly acylamonia resins, amino resin, and poly vinyl-alcohol Butyl aldehyde resins, etc. The latter resins should be dissolved in a suitable solvent (e.g. dimethyl benzene and/or acetate butyl ester). Other compatible carriers are common lacquer, polyurethane, varnish, and enamel. A variety of adhesives might also be used as a carrier and which can be found in dry or liquid forms. The pigments typically need only be mixed with the carrier, although suitable quantities of anti-deposition, erasing foam, and dispersion agents can be added as desired. The pigments can be mixed in concentrations ranging from 20% to 50% by weight.

The foregoing pigments are typically available in granulated form with particulate sizes ranging from 10 to 65 um. Commonly available colors include yellow, green, red, orange, and blue and which variously glow yellow-green, blue-green, blue, red, orange-red, orange, yellow, green and blue. Combinations of the colors may also be applied. When applied in a suspension mixture formulation, an application thickness on the order of 100 to 150 um provides a sufficient afterglow that lasts for several hours. The relatively thin coating is also relatively elastic and permits normal bait movement.

Presently preferred mixtures provide for approximately 30% pigment and 70% carrier. The pigment is presently mixed in conventional fashion with a clear, low gloss polyurethane sealer. No additional additives are included. Flexible sealers and/or waterproof adhesives (e.g. room temperature vulcanization (RTV) materials) alone or in combination are also desirable carriers, since they enhance the ability of the live bait to move without dislocating the coating. The sealer must also be tolerant to any abrasive qualities of the bedding in which the bait is stored.

The following processes have been used in association with wax worms, although are believed compatible with a variety of other common larval baits such as mealworms, spikes, and maggots. Body movements for baits of this type are relatively constrained both during storage and use, which minimizes possible dislocation of the applied coatings. The particulate size of the pigment is also relatively small and not affected by bait movement. Larval baits also exhibit limited oxygen requirements. Partial coating also tends not to interrupt or interfere with normal body functions, such as eating, breathing and emitting normal body secretions, and does not appear to affect the bait's normal scent.

The bait, which is normally stored at temperatures in the range of 50° F. to 60° F., is initially prepared by raising the bait to room temperature. The bait may also be simultaneously dried, such as by passing a stream of warmed air over the bait. The bait is then ready to be coated.

With attention to FIG. 1, which describes a presently preferred process and after performing the foregoing preparation, a manageable quantity of bait is deposited in a flat container and distributed with a spatula. The bait is next spread apart with a spatula or other spreader device to prevent overlaps, such as the bait to crawling onto neighbors, which can result in reduced coverage and/or possible sticking or adhesion between the bait prior to final cure. The bait might also be distributed and spread with adjoining wiper blade(s) over a conveyor belt that is appropriately sequenced to a continuous, ongoing process.

Figure 3:
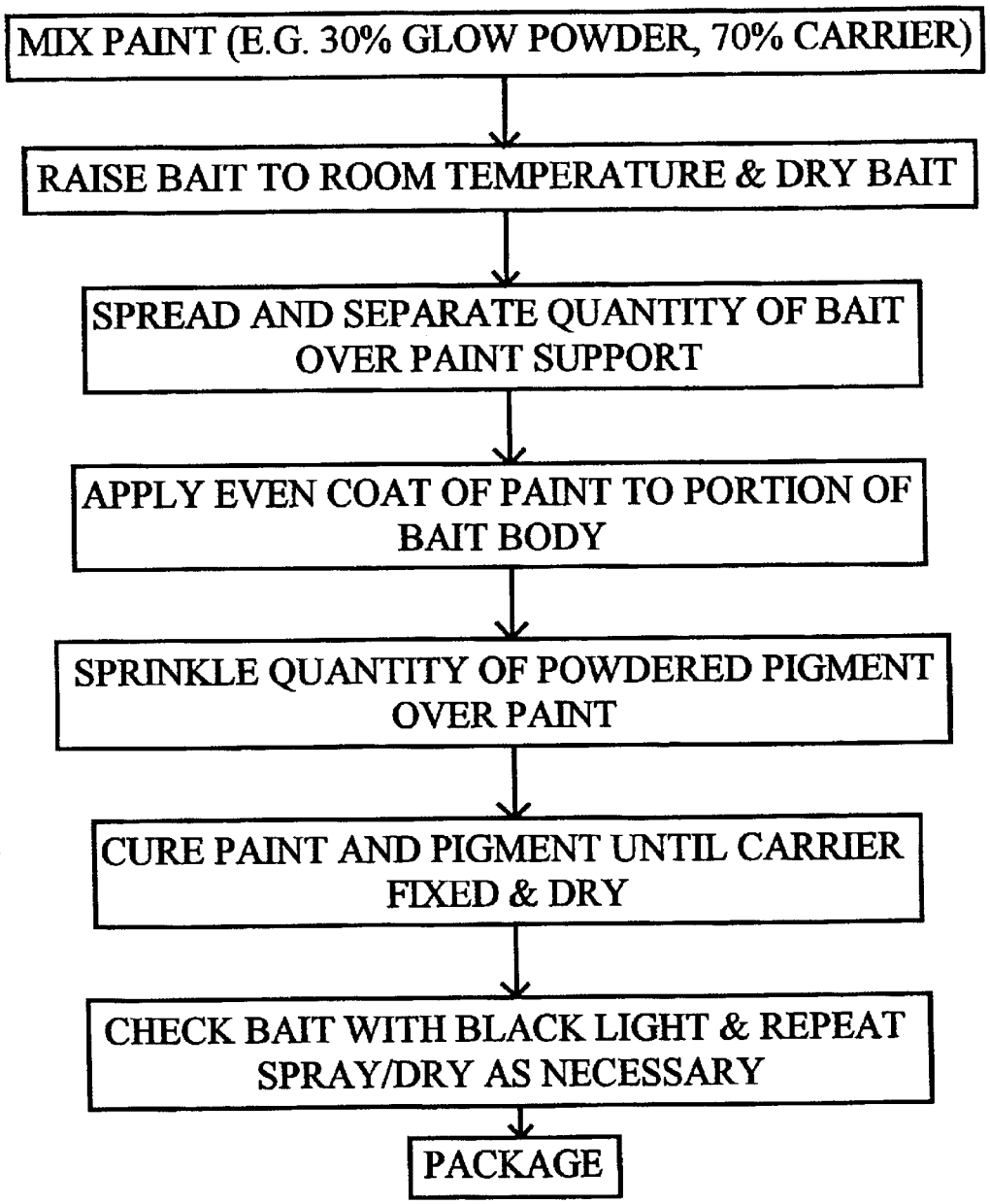
FIG. 3 is a process flow chart to a hybrid paint and powdered coating colorization process.

The previously prepared suspension mixture is next applied in a suitable fashion to evenly cover the backs of the bait. A spray applicator is used and operated at a relatively low pressure to provide a displacement pattern relative to the bait that merely covers the bait without physically blowing or moving the bait on the support. The bait is nominally coated to thickness that assures good color definition and glow retention, once illuminated with a suitable light source. Preferably, an amount of pigment bait should be applied that permits the bait to glow for 10 to 30 minutes. A contrasting powdered pigment might also be applied to the bait while the paint is tacky, reference FIG. 3, thereby reducing the ultimate thickness of applied carrier.

The coated bait is next subjected to a curing step that take approximately 3 to 30 minutes or any other desired amount of time to assure the carrier has cured without affecting the health of the bait. The bait is presently subjected to a temperature on the order of 80° F. to 110° F. for approximately 3 to 5 minutes, such as provided with heat lamps. A stream of heated, low-pressure air might also be passed over the bait to facilitate curing without inducing bubbles. Ideally the bait remains relatively motionless during curing to prevent possible sticking and clumping that might occur if the bait contacts neighbors during curing.

The cured bait is next inspected by exposing the bait to black light. Black light highlights any bait that was not coated or partially coated. The defective bait can be culled and re-coated as appropriate. Multiple coatings with the same suspension mixture or another mixture containing one or more different colors can be applied to obtain a desired coloration. For example, several layers of different paint mixtures of glow or opaque pigments can be applied. Powdered pigment may also be applied, while the carrier is tacky or in the fashion of the following described process to provide a contrasting coloration.

Selected quantities of the finally approved bait are then packaged in suitable containers and beddings to physically and thermally protect the bait during storage, shipping and use. Wax worms are typically packaged in sawdust, which can be relatively abrasive to the colorized coating and thus the numbers of bait per container is controlled.

Figure 2:
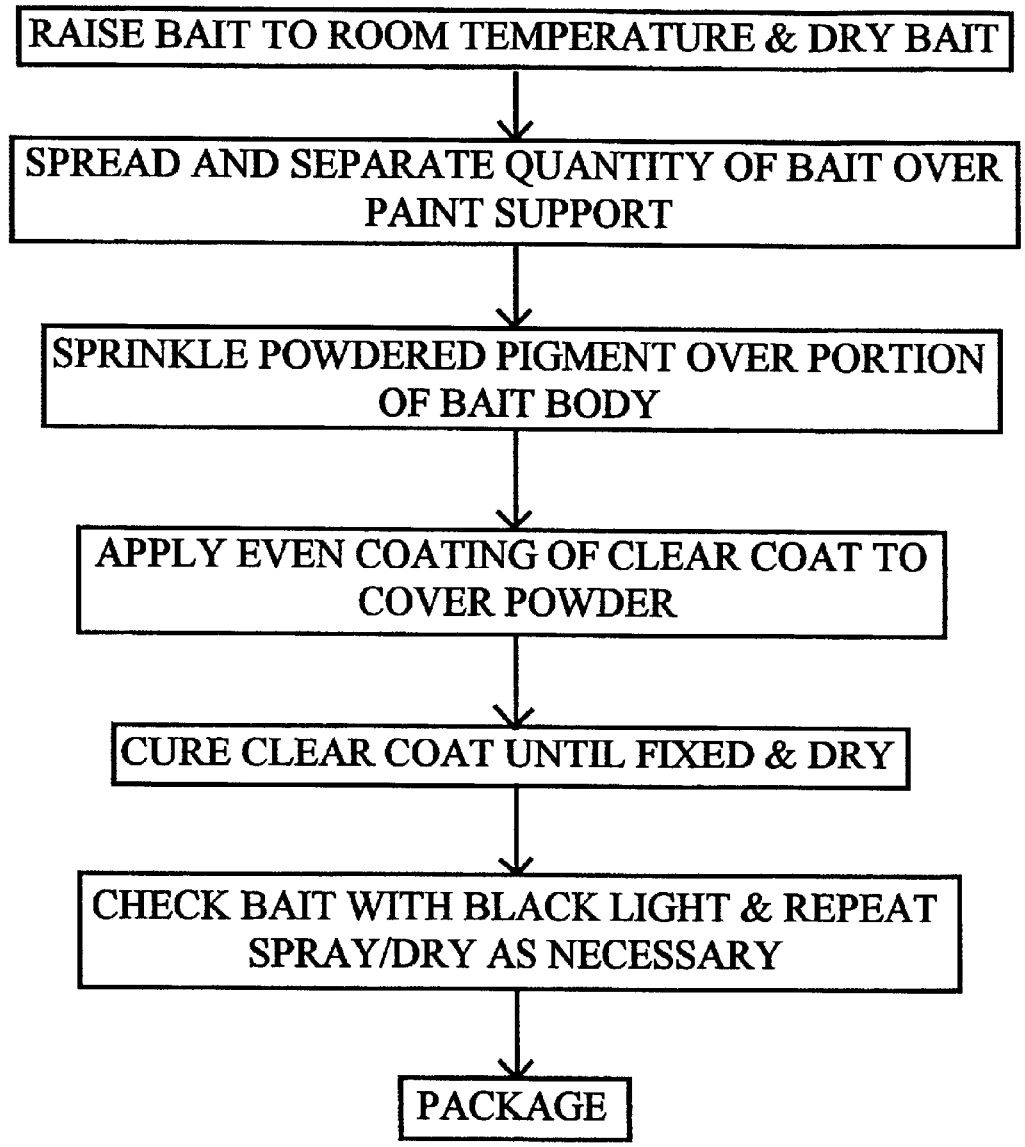
FIG. 2 is a process flow chart to a powdered coating colorization process.

Turning attention to FIG. 2, an alternative coloration process is disclosed wherein, once the bait is dried and spread, a quantity of powdered pigment is applied to the bait. An adhesive may be included with the pigment to facilitate pigment retention. Such an adhesive may comprise a dry adhesive, dry clear coat material or dry, heat activated adhesive.

A suitable clear coat material, such clear polyurethane, is next applied to fix the pigment. The bait is then subjected for a sufficient period to a moderate heat to cure the coating and/or adhesive without injuring the bait. Inspection, re-coating and packaging proceeds as before. If a dry adhesive or clear coat material is mixed with the pigment or applied after the pigment coating step, curing may proceed directly to set the pigment with the adhesive.

When fishing with the improved bait, the bait is used in conventional fashion. That is, the bait is secured to a suitable hook or fishing lure. The bait is then exposed for a sufficient duration to a suitable light source. Sunlight or flashing the bait with light from a camera light source excites and induces the phosphorescent colorant to glow. Depending upon the portion of the spectrum at which the colorant glows, the colorant will be visible with differing intensity for differing amounts of time when the bait is submersed into the water.

While the invention has been described with respect to a particular bait species and a number of preferred processes and considered improvements or alternatives thereto, still other bait types and processes may be suggested to those skilled in the art. It is also to be appreciated that selected ones of the foregoing process steps can be used singularly or can be arranged in different combinations to provide a variety of improved colorized and/or luminous live baits. For example, a base coat of a primary luminous pigment can be covered with a light sprinkle coat of a second contrasting luminous or opaque pigment. The improved bait are colorized in a fashion that assures the bait continues to exude a distinct scent in combination with an enhanced visual colorization and without interrupting normal body movement. The foregoing description should therefore be construed to include all those embodiments within the spirit and scope of the following claims.

What is claimed is:

1. A process for colorizing live bait having a body comprising:
   a) distributing a quantity of a selected live bait onto a painting support;
   b) coating a portion of the body of the supported bait with a nontoxic mixture including a waterproof adhesive and a colored pigment suspended in a carrier; and
   c) curing the applied mixture and wherein said cured mixture exhibits an elasticity that permits bait movement, whereby the bait exhibits an enhanced color without effecting the bait's movement and scent.

2. A process as set forth in claim 1 wherein said colored pigment comprises a luminous phosphorescent material.

3. A process as set forth in claim 1 wherein said mixture comprises 20% to 50% by weight of a luminous phosphorescent material and 50% to 80% by weight of a clear carrier.

4. A process as set forth in claim 1 wherein said curing occurs at a temperature in the range of 80° F. to 110° F. for approximately 3 to 5 minutes.

5. A process as set forth in claim 1 wherein said mixture is spray applied.

6. A process as set forth in claim 1 including the sprinkling of a powdered pigment over the coated bait, prior to curing.

7. A process as set forth in claim 1 including the sprinkling of a powdered pigment over the cured bait, spraying the coated bait with a clear fixative and curing the clear fixative.

8. A process for colorizing live bait having a body comprising:
   a) distributing a quantity of a selected live bait onto a painting support;
   b) sprinkling a powdered colored pigment over a portion of the body of the supported bait;
   c) spraying the powdered pigment with a clear fixative; and
   d) curing the applied fixative to bind the pigment to the bait and wherein said cured fixative exhibits an elasticity that permits bait movement, whereby the bait exhibits an enhanced color without effecting the bait's scent.

9. A process as set forth in claim 8 wherein said colored pigment comprises a luminous phosphorescent material.

10. A process as set forth in claim 8 wherein said curing occurs at a temperature in the range of 80° F. to 110° F. for approximately 3 to 5 minutes.

11. A process as set forth in claim 8 wherein said fixative comprises a waterproof adhesive.

12. A process for colorizing live bait having a body comprising:
    a) distributing a quantity of a selected live bait onto a painting support;
    b) spraying a portion of the body of the supported bait with a nontoxic paint mixture of a colored pigment and a carrier; and
    c) sprinkling a powdered color pigment over the painted bait;
    d) curing the applied paint at a temperature in the range of 80° F. to 110° F. for approximately 3 to 5 minutes and wherein said cured paint exhibits an elasticity that permits bait movement, whereby the bait exhibits an enhanced color without effecting the bait's scent.

13. A process as set forth in claim 12 wherein said colored pigment in said paint mixture comprises a luminous phosphorescent material.

14. A process for colorizing live bait having a body comprising:
    a) distributing a quantity of a selected live bait onto a painting support;
    b) elevating the temperature of and drying the bait;
    c) coating a portion of the body of the supported bait with a nontoxic mixture of a colored pigment suspended in a carrier; and
    d) curing the applied mixture and wherein said cured mixture exhibits an elasticity that permits bait movement, whereby the bait exhibits an enhanced color without effecting the bait's movement and scent.

15. A process as set forth in claim 14 wherein said colored pigment comprises a luminous phosphorescent material.

16. A process as set forth in claim 14 including the sprinkling of a powdered pigment over the coated bait, prior to curing.

17. A process as set forth in claim 14 including the sprinkling of a powdered pigment over the cured bait, spraying the coated bait with a clear fixative and curing the clear fixative.

18. A process as set forth in claim 12 including the step of drying the bait before spraying the bait.

19. A process for colorizing live bait having a body comprising:
    a) distributing a quantity of a selected live bait onto a painting support;
    b) drying the bait;
    c) coating a portion of the body of the supported bait with a nontoxic mixture of a luminous phosphorescent pigment suspended in a clear, waterproof liquid fixative; and
    d) curing the fixative to bind the pigment, wherein said curing occurs at an elevated temperature in the range of 80° F. to 110° F. for a time sufficient to set said fixative, whereby the bait exhibits a luminous color without inhibiting bait movement and scent.

20. A process as set forth in claim 19 including the sprinkling of a powdered pigment over the coated bait, prior to curing.

* * * * *